INVENTOR.
RUDOLPH DAUB

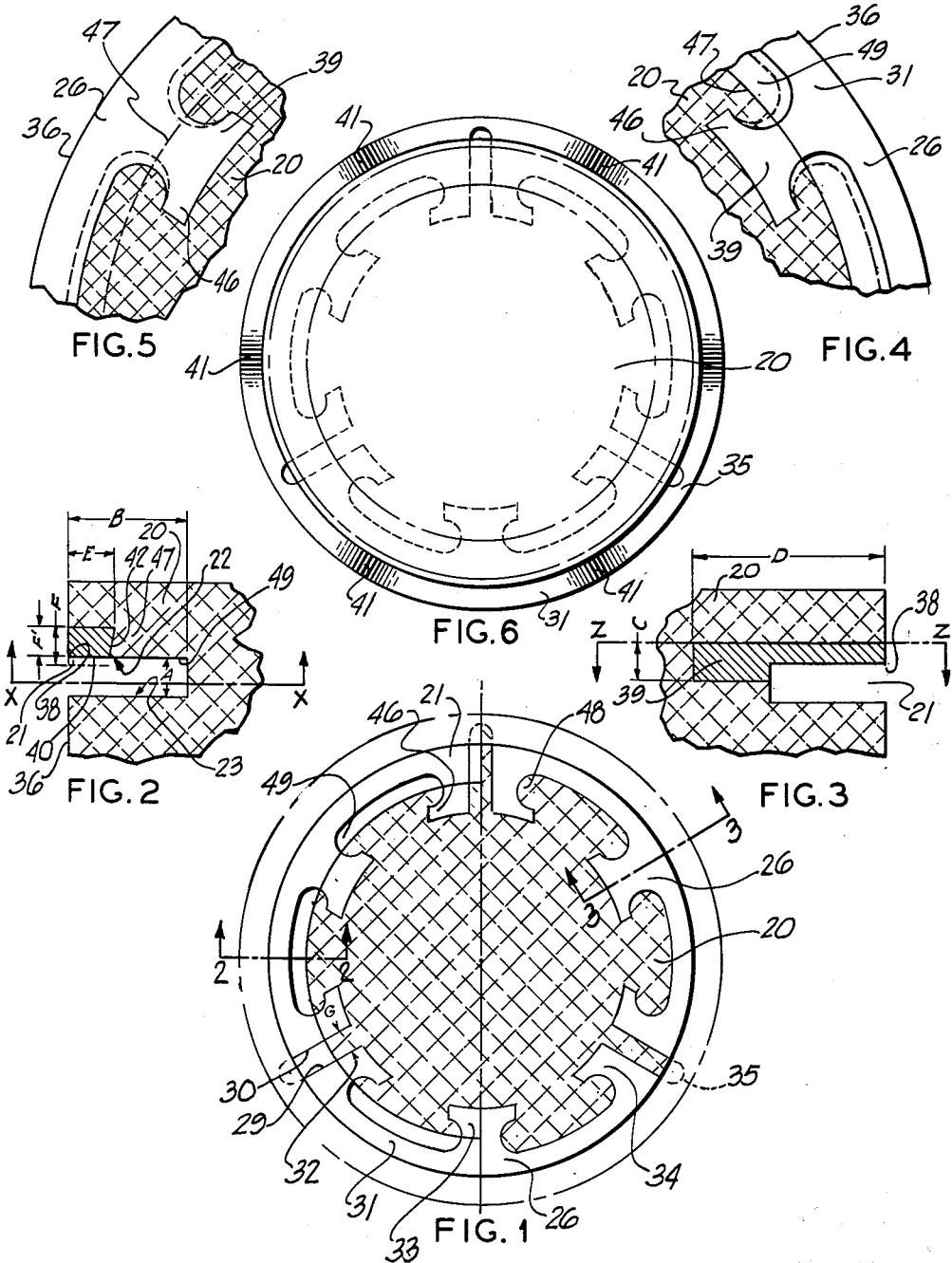

Feb. 27, 1962 R. DAUB 3,023,061
PISTON HEAD STRUCTURE
Filed Dec. 10, 1958 3 Sheets-Sheet 3
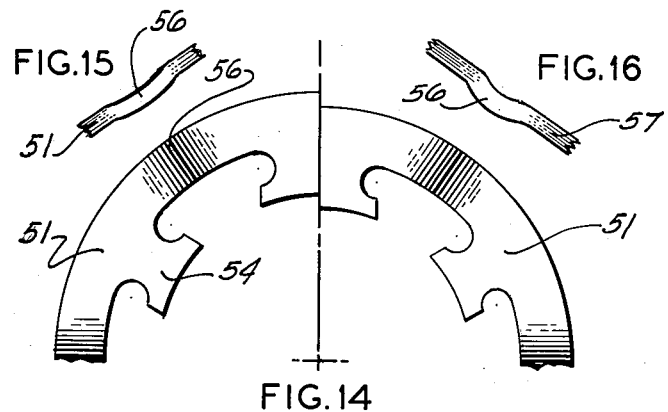
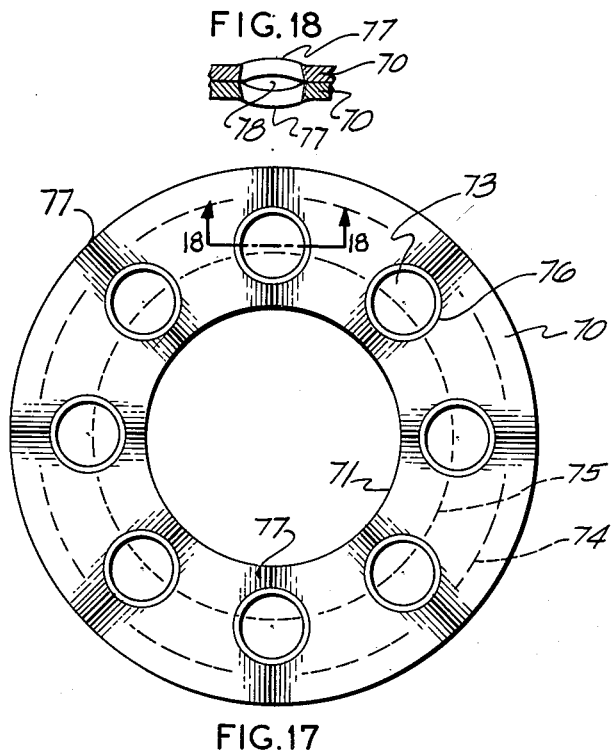
INVENTOR.
RUDOLPH DAUB
BY

United States Patent Office 3,023,061
Patented Feb. 27, 1962

1

3,023,061
PISTON HEAD STRUCTURE
Rudolph Daub, 9 Hickory Drive, North Caldwell, N.J.
Filed Dec. 10, 1958, Ser. No. 779,371
24 Claims. (Cl. 309—14)

This invention relates to aluminum pistons for high compression internal combustion engines and is directed particularly to the combination of the piston head and wear-resistant members forming the piston ring groove surfaces and edges.

An object of this invention is to provide a piston made of aluminum material with wear-resistant insert means in the piston head forming a substantially continuous wear-resistant edge on the piston ring groove. The wear-resistant insert means is free from large internal stresses and is securely locked in the piston head to provide a long life to the piston.

A further object of the invention is to provide a wear-resistant reinforcing insert means in the piston ring groove surface that forms a substantially continuous outer edge and is free to respond to the cooling of the cast piston without the development of high stresses in the insert means.

Other and further objects and advantages will become apparent from the following description taken in connection with the drawings in which FIG. 1 is a multisectional view of a piston head with section X—X taken along lines X—X of FIG. 2 and section Z—Z taken along lines Z—Z of FIG. 3;

FIG. 2 is a fragmentary sectional view of the piston head and the piston ring groove taken along lines 2—2 of FIG. 1;

FIG. 3 is a fragmentary sectional view of the piston head and piston ring groove taken along lines 3—3 of FIG. 1;

FIG. 4 is an enlarged fragmentary sectional view along lines X—X of FIG. 2;

FIG. 5 is an enlarged fragmentary sectional view along lines Z—Z of FIG. 3;

FIG. 6 is a top view of an unmachined cast piston illustrating the insert projecting from the piston;

FIG. 14 is a fragmentary comparison of the relationship of the insert before and after casting in the piston head;

FIG. 15 illustrates an edge view of the bias crimp in the insert before molding;

FIG. 16 illustrates an edge view of the bias crimp after molding;

FIG. 17 illustrates another embodiment of the insert which has large openings and bias crimps formed on the inner and outer sides of the openings; and FIG. 18 is a sectional view of FIG. 17 along lines 18—18.

Figure 8:
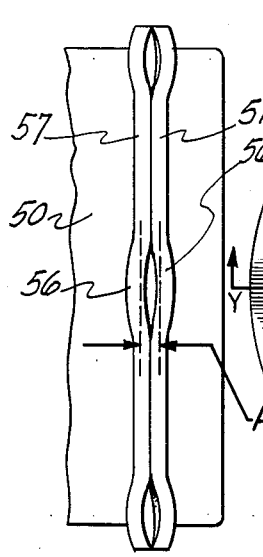
FIG. 8 is a side view of a piston of the type illustrated in FIG. 7 with upper and lower inserts.

In the embodiments illustrated in the drawings the pistons are made of aluminum or an aluminum alloy. The piston ring groove surfaces and edge are armored with wear-resistant insert means to maintain a continuous and smooth piston ring groove sealing surface and to provide an even, continuous edge to the piston ring groove over a long period of use of the piston. The wear-resistant insert means provides a substantially continuous outer wear-resistant margin and edge to the piston ring groove and radial portions extending inwardly from the outer edge to radially within the piston ring groove. The wear-resistant insert means includes means to permit the insert means to respond to the cooling of the molded piston head so that large internal stresses are not developed in the insert means and between the insert means and the piston material as the piston cools during the molding operation. These stress releasing means further permit the insert means to respond to the expansion and contraction of the piston during the use of the piston in an internal combustion engine.

In FIGS. 1–3 sectional views of a finished piston with insert means are illustrated. The piston head 20 is made of aluminum material such as aluminum or aluminum alloy and has a top ring groove 21 for retaining a steel piston ring (not shown). The piston ring groove has a narrow axial width A and a long radial depth B and upper and lower piston ring groove surfaces 22 and 23 against which the piston ring bears to seal the combustion chamber.

In this embodiment the insert means in a finished piston comprises three separate inserts 26 extending over an arc of about 120°. Each of the inserts 26 has a continuous circumferential portion 31 and radial portions 32, 33 and 34. The circumferential portion 31 has a radial width E which is less than the radial depth B of the piston ring groove and may be greater than one-half the depth B or less than one-half the depth B. The circumferential portion forms a wear-resistant outer margin 40 in the piston ring groove surface and an outer edge 38 with the outer cylindrical surface 36 of the piston head. The surface 40 and the edge 38 extend over an arc of substantially 120° and with the edges and margins of the inserts form a substantially continuous outer surface and edge in the piston ring groove surface. The radial portions 32 and 34 are positioned at opposite ends of the inserts 26 and the radial portion 33 is positioned at the middle of the circumferential portion 31 to divide the circumferential portion 31 into two parts. The circumferential portions extend radially inward of the piston ring groove to form continuous wear resistant surfaces from the outer edge 38 to radially within the piston ring groove. The radial portions have radial locking means formed by inner circumferential portions 46. The spacing of the radial portions forms large areas between the radial portions and along the circumferential parts for receiving the aluminum projections 48. The projections 48 extend between the outer circumferential portion and the inner circumferential portion on the radial portions to radially lock the inserts within the piston head. The projections 48 form large heat conducting paths from the upper portion of the piston head downward past the piston ring grooves.

The projections 48 extend into the piston ring groove to form a portion 49 of the piston ring groove surface. The circumferential portion has an inclined surface 42 facing the piston ring groove and overlapping with the wedge-shaped portions 47 of the projections 48 to axially lock the inserts in the piston head. At each end the surfaces 42 curve to form the sides of the respective radial portions 32, 33 and 34 so that the wedge-shaped portion 47 curves to extend radially along the radial portions to axially lock the radial portions in the piston along with the circumferential portions. Thus, the inserts are securely locked radially and axially in the piston heads. As previously stated, the radial portions extend radially inwardly of the piston ring groove to a depth D and have a thickness C which is preferably greater than one-half the width of the piston ring groove. The free ends 29 and 30 of the inserts 26 are spaced apart a distance G to provide sufficient space for the aluminum material between the ends in order to avoid rupture of the piston head.

Prior to the molding of the piston the insert means is formed as a single piece by having connecting portions 35. As indicated in FIG. 6, the individual inserts 26 are connected together as a single piece by the connections 35. The connecting portions 35 are not embedded in the piston and the ends 29 and 30 of the inserts extend outwardly beyond the unfinished surface 37 of the piston. The inserts have a crimped or biased portion 41 in the circumferential portion between the radial portions. The crimped portions are bowed axially and extend from the inner surface 42 to the outer edge of the insert. As pressure is applied to the insert, the deflection of the bias increases to permit a reduction in the peripheral length of the insert 26. The crimped portion may be bent in the insert when the insert means is stamped. The inserts are positioned in the mold so that the crimp is bowed away from the location of the piston ring groove. With these circumferentially spaced crimped or biased portions, the inserts may move in radially as the aluminum metal cools. As the insert moves in, the crimp 41 bows still further away from the piston ring groove, thus foreshortening the peripheral length of the insert in the piston head. The bowing of the crimp portion relieves the stresses created by the drawing in of the inserts by the aluminum of the metal. The connecting portions 35 may also yield to reduce the circumference of the insert means. In FIGS. 14–16 a comparison of the insert before and after molding is shown. The insert means is reduced in circumference by the cooling of the insert means and the metal and by the contracting forces of the aluminum material. The biased crimps bow axially away from the location of the piston ring groove as indicated in FIGS. 15 and 16. Since the circumferential portion of the insert and the location of the crimps do not extend the full depth of the piston ring groove, the separation of one insert from the opposing insert is eliminated in the finishing process and the formation of the piston ring groove.

The circumferential portions of the inserts have a sufficient thickness F so that when the crimp is bowed, the surface facing the piston ring groove lies within the space in which the groove is to be cut. Thus, the outer margin 40 forms a continuous wear-resistant surface. With the bowing of the circumferential portion less metal is cut from the circumferential portion between the radial members. This is best indicated by comparing the sections of pistons illustrated in FIGS. 10 and 11. The thickness F' is greater than the thickness F'' of the circumferential portion which is located radially from the radial members. This thickness increases the strength of the thin connection portion between radial members to strengthen the insert against rupture of the connecting portions between the radial members during the molding of the piston and in the subsequent use of the piston in an internal combustion engine. Thus, with the crimping of the inserts between the radial portions the internal stresses of the inserts are relieved and the connecting portion between the radial portions is increased; therefore, the insert is increased in strength without increasing the overall thickness F or C of the insert. Conversely, the insert may be reduced in thickness without a loss of strength in the connecting portions. An insert which is lighter in weight may be used. The thickness F' of the intermediate portion provides a larger sloped surface 42 for a more secure locking of the intermediate portion. The thin inserts with the radial anchorage within the piston body strengthen the piston lands.

In the molding of the piston the molten aluminum material is poured into the mold which is supporting the inserts. The molten aluminum flows around the inserts filling in the openings and contacting the surfaces. The connecting portions 35 are resilient and permit the ends of the inserts to move toward one another, thereby preventing the creation of undue stress in the insert. The axial position of the insert remains fixed so that the radial relationships of the surfaces and various portions are maintained as the molten aluminum solidifies and the inserts cool with the aluminum. The molten aluminum material engages the inserts and a mechanical lock between the aluminum and the insert is formed. As the aluminum cools, the insert cools. The aluminum contracts at a greater rate than the insert. The resilient construction permits the insert to be drawn radially inward with the shrinking aluminum without the creation of excessive stresses within the insert or the aluminum material of the piston head which may cause the intermediate portions of the inserts to rupture, and the inward movement of the ring maintains the lock between the surfaces of the insert and the piston head during solidification and cooling.

Figure 7:
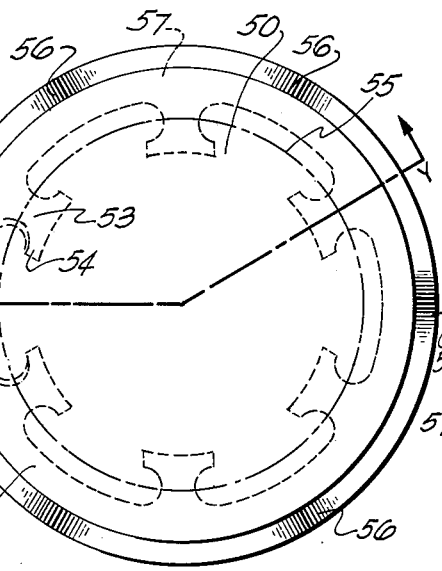
FIG. 7 is a top view of an unmachined cast piston illustrating another embodiment of the insert.

FIG. 7 is an end view of a piston 50 with an insert 51 before the piston is machined. The embedded portion of the insert is illustrated in the dash lines. The insert 51 has a continuous outer ring or member 52 extending around the piston head without any free ends. The outer ring or member has radial members 53 extending inwardly in the plane of the ring and has circumferential inner members 54 radially within the groove for forming recessed portions on each side of the radial member for radially locking the insert in the piston head. The aluminum of the piston head flows and fills in the recessed portions of the radial members to form projections 55 between the circumferential inner portions and the outer ring. These projections form radially locking means with the inner portions.

Figure 10:
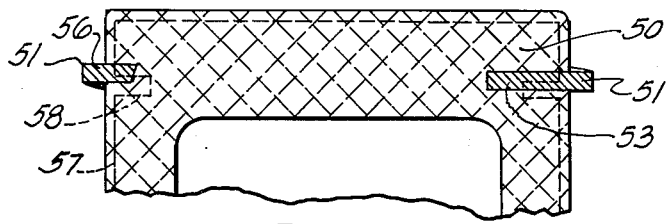
FIG. 10 is a sectional view of an unfinished piston taken along lines Y—Y of FIG. 7.

These radial locking means draw the insert radially inward as the piston head solidifies and cools. The outer ring has a plurality of crimp portions 56 biased to flex axially to accommodate the insert to a reduced circumference to prevent the creation of large internal stresses in the outer member and within the piston head. The piston head is machined to form a surface 57 illustrated by the dash lines (FIG. 10). A piston ring groove 58 is cut in the piston head to a radial depth or width illustrated by the dash lines. The inner axial wall 60 of the piston ring groove is radially within the outer ring and between the outer ring and the inner circumferential members.

When forming the piston ring groove the inner surface of the piston ring groove is cut to leave a substantial radially locking projection. As in the other embodiments described, the ring and the recessed portions of the radial members have a surface 61 at an angle to the piston ring groove and facing the piston ring groove to form an axial locking means with the wedged portion 62 of the piston head as previously described.

Figure 9:
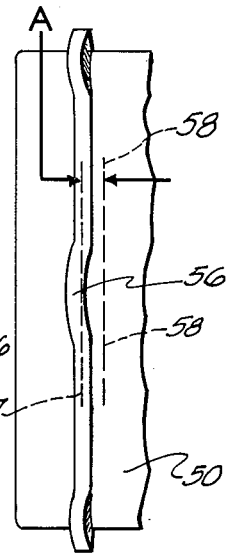
FIG. 9 is a side view of the piston with a single insert for forming the upper piston ring groove surface.

As illustrated in FIG. 14 the insert means is drawn inwardly by the shrinking forces. The biased crimps bow axially away from the location of the piston ring groove. The molten or plastic aluminum material is deformed under the pressure of the crimp and the increase in the deflection of the crimp causes the concave side of the insert to move away from the piston head metal or away from the companion insert as illustrated in FIG. 8. Since the circumferential portion of the insert at the location of the crimps does not extend the full depth of the piston ring groove, this separation is eliminated in the finishing process and the formation of the piston ring groove. The inserts have a sufficient thickness and the initial crimp is sufficiently slight so that the crimp is not bowed completely away from the piston ring groove surface. The piston ring groove surfaces in relation to the concave surfaces of the insert are illustrated in FIGS. 8 and 9. Thus, the outer margin of the piston ring groove surface has a continuous steel wear-resistant surface extending around the piston.

Figure 12:
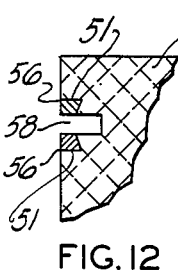
FIGS. 12 and 13 are fragmentary sectional views illustrating pistons with upper and lower inserts.
Figure 11:
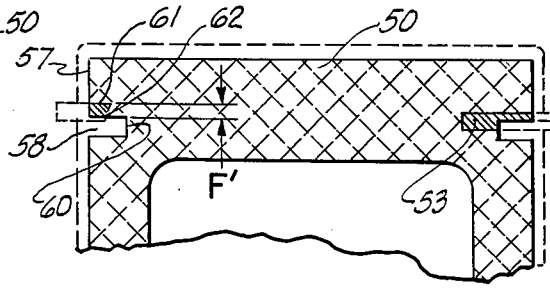
FIG. 11 is a sectional view of a finished piston taken along a section of a finished piston similar to the section along lines Y—Y of FIG. 7.
Figure 13:
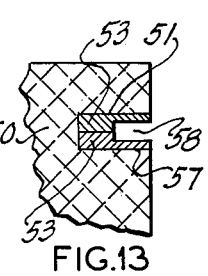

In FIGS. 11–13 sectional views of finished pistons are illustrated. FIGS. 12 and 13 show upper and lower inserts. These inserts, like the other insert means, have a thickness greater than one-half the width of the groove and the inner ends of the radial portions are in contact along their facing surfaces as illustrated in FIG. 13. Thus, the inner axial wall of the piston ring groove will have alternate spaces of wear-resistant surfaces and aluminum surfaces. With insert means in the upper and lower piston ring grooves, the inserts before being molded may be fastened together by welding the inserts at locations between the crimped or biased portions. The crimped portions are axially aligned and bowed in opposite directions. The crimps forming an apparent bow in the insert means clearly indicates whether or not the inserts have been properly positioned in relation to one another. Thus, the error of fastening one insert to another in an inverted relationship is avoided and the correct positioning of the sloped surface is ensured.

In FIGS. 17 and 18 another embodiment of the invention is illustrated in which the insert means 70 has a continuous inner edge 71 and a continuous outer edge 72 and large circular openings 73 extending through the insert means. The location of the outer surface 74 of the piston and the inner axial surface 75 of the piston ring groove is shown in the dash lines. It is thus seen that a continuous outer margin or surface is formed in the piston ring groove. In the finished piston the openings extend to form a portion of the piston ring groove surface of aluminum material projecting through the opening. The opening has sloped or beveled surfaces or edges 76 for axially locking the inserts by means of the aluminum projections. The openings extend radially within the piston ring groove so that the projections extend continuously through the insert to radially lock the insert by means of a continuous inner portion of the insert means. In order to accommodate for the shrinkage of the inserts on the solidification and cooling of the piston, a plurality of radially extending bias crimps 77 are provided on opposite sides of the opening and radially in line therewith. As with the biased or crimped portions described previously, the crimps bow under the internal pressure as indicated in FIG. 18. With the biased or crimped portions radially positioned in relation to the openings, the aluminum will readily flow in the passage 78 formed by the crimped portions of two inserts. Thus, the crimped portions on the inner sides of the openings will be filled with aluminum so that there will be no void within the piston.

Thus, the combination of an insert forming a continuous outer margin and edge with the crimped portions between the radial members provides a strong, yieldable insert that remains firmly locked within the piston head and provides a substantial wear-resistant surface to the piston ring groove.

I claim:

1. A piston structure comprising a piston head of aluminum material, a piston ring groove in said head having radially extending upper and lower piston ring groove surfaces, a member embedded in said piston head extending peripherally and circumferentially around a substantial portion of the circumference of said piston head and having radial portions extending inwardly in the plane of said member a distance greater than the depth of the piston ring groove, said radial portions having radial locking means for holding said member in the piston head, said member having a radial width between said radial members less than the depth of the groove and having sufficient rigidity and strength to prevent rupture of said member and sufficiently yieldable to respond to the expansion and contraction of said piston head, and said member having at least one axially biased portion for bowing said member away from said piston ring groove to permit the radially inward contraction of said member on cooling of said piston head and to prevent the creation of large internal stresses within said member between said member and said piston head.

2. A piston structure as set forth in claim 1 wherein a plurality of said biased portions is circumferentially positioned around said member to provide for a uniform contraction of said member.

3. A piston structure as set forth in claim 1 in which said member has a circumferentially extending inner surface facing said piston ring groove, a piston head portion between said outer surface and said piston ring groove surface for axially locking said member in said piston head.

4. A piston structure as set forth in claim 3 wherein said surface is at an angle to said piston ring groove surface and facing said piston ring groove and said piston head portion is wedge-shaped to axially lock said member in said piston head.

5. A piston structure as set forth in claim 1 wherein said radial locking means on said radial portions comprise inner circumferentially extending members in the plane of said member and said piston head has projections fitting radially outward of said circumferentially extending portions to lock said member in said piston head.

6. A piston structure as set forth in claim 1 wherein said radial portions have a thickness greater than one-half the width of said piston ring groove.

7. A piston structure as set forth in claim 6 wherein two members are provided and the inner portions of said radial portions are in contact radially within said piston ring groove.

8. A piston structure as set forth in claim 1 wherein said member forms a circumferentially continuous wear-resistant surfaced outer margin in one of said piston ring groove surfaces.

9. A piston structure as set forth in claim 1 wherein the surface of the outer margin is continuous at the biased portions.

10. A piston structure as set forth in claim 1 wherein said biased portion has an inner surface at an angle to said piston ring groove and facing said piston ring groove to form with said piston head a wedge-shaped portion for axially locking said biased portion in the bowed position.

11. An insert comprising a continuous flat steel ring having radially extending inward portions in the plane of said ring with radially locking portions at the inner ends thereof, said ring having a radial width to form a continuous circumferential ring in a finished piston and having an axially bowed portion between two radial portions to permit the contraction of said ring on the cooling of said insert in a molded piston by the axial bowing of said biased portion.

12. An insert as set forth in claim 11 wherein said ring has inner circumferentially extending surfaces between said radial portions, said surfaces being at an angle to said insert for axially locking said insert in the piston head.

13. A piston structure comprising a piston head of aluminum material, a piston ring groove in said head having radially extending upper and lower piston ring groove surfaces, a member embedded in said piston head and extending continuously around said piston head at one of said piston ring groove surfaces and having radially extending inward portions with radially locking means for holding said member in said piston head, said member having a radial width less than the depth of said piston ring groove and having an axial width to provide sufficient rigidity and strength to prevent rupture of said member and sufficiently yieldable to respond to the expansion and contraction of said piston head, said member and said piston head having means to permit the contraction of and the reduction in the circumference of said member with said piston head on the cooling and solidification of said piston head to maintain the lock between said head and said member and to prevent excessive internal stresses within said member between said member and said piston head.

14. A piston structure comprising a piston head of aluminum material, a piston ring groove in said head having radially extending upper and lower piston ring groove surfaces, a member embedded in said piston head extending over a substantial arc of the periphery of said piston and having an outer edge between one of said piston ring groove surfaces and the outer surface of said piston head and having an outer margin in the piston ring groove surface and extending radially inward a distance less than the depth of the groove and having an axial width to provide sufficient rigidity and strength to prevent rupture of said member and sufficiently yieldable to respond to the expansion and contraction of said piston head, said edge and said margin extending over said arc to reinforce said piston head, radial members extending inwardly from said outer member and circumferentially spaced along said arc and extending inwardly and having radial locking means extending radially within said piston ring groove to radially lock said circumferential member in said piston head and said member having free ends at the end of the arc over which said member extends to permit the member to respond to the expansion and contraction of the piston head.

15. A piston structure as set forth in claim 14 wherein the portions of said radial portions radially within said piston ring groove have a thickness greater than one-half the width of said groove.

16. A piston structure as set forth in claim 14 wherein said member has an inner surface between said radial members at an angle to said piston ring groove and facing said piston ring groove and said piston head has wedge-shaped projections positioned between said surface and said piston ring groove to axially lock said member in said piston head.

17. A piston structure as set forth in claim 14 wherein a radial portion is positioned at a respective free end to radially lock said free end in said piston head.

18. A piston structure comprising a piston head of aluminum material, a piston ring groove in said head having radially extending upper and lower piston ring groove surfaces, a member embedded in said piston head extending peripherally and circumferentially around a substantial portion of the circumference of said piston head and having radial portions extending inwardly in the plane of said member a distance greater than the width of said member, said radial portions having radial locking means for holding said member in the piston head, said member having a radial thickness between said radial members less than the depth of the groove and having sufficient rigidity and strength to prevent rupture of said member and sufficiently yieldable to respond to the expansion and contraction of said piston head, and said member having at least one axially biased portion for bowing said member away from said piston ring groove to permit the radially inward contraction of said member on cooling of said piston head to prevent the creation of large internal stresses within said member and between said member and said piston head.

19. A piston structure comprising a piston head of aluminum material, a piston ring groove in said head having radially extending upper and lower piston ring groove surfaces, ring shaped member embedded in said head extending circumferentially around said head and extending radially inward a distance greater than the depth of said groove to reinforce only one of said groove surfaces, said member having radial locking means for holding said member in said piston head and at least one axially biased portion for bowing said member away from said piston ring groove to permit the radial inward contraction of said member on cooling of said piston head and to prevent the creation of large internal stresses within said member and between said member and said piston head.

20. A piston structure as set forth in claim 19 wherein said radial locking means comprises openings through said member and piston head portions of aluminum material extending through said openings, said openings and piston head portions extending radially to form said member with circumferential portions with reduced width.

21. A piston structure as set forth in claim 20 wherein said axially biased portions extend radially through said openings to form crimps in said reduced portions.

22. A piston structure as set forth in claim 21 wherein a second member is provided to only reinforce said other groove surface and extending radially inward a distance greater than the depth of said groove and having openings therethrough with piston head portions of aluminum material forming radial locking means, axially biased portions for bowing said member away from said piston ring groove extending through respective openings to form crimps axially aligned with the crimps of said first member, said first and second members having radial portions between said openings in engagement and each of said radial portions having an axial thickness greater than the width of said groove.

23. A piston structure comprising a piston head of aluminum material, a piston ring groove in said head having radially extending upper and lower piston ring groove surfaces, a member embedded in said piston head and extending continuously around said piston head at one of said piston ring groove surfaces and having radially extending inward portions with radially locking means for holding said member in said piston head, said member having a radial width less than the depth of said piston ring groove and having an axial width to provide means having sufficient rigidity and strength to prevent rupture of said member and sufficiently yieldable to respond to the expansion and contraction of said piston head by changes in the length of said member as measured in the circumferential direction of said member.

24. A piston structure comprising a piston head of aluminum material, a piston ring groove in said head having radially extending upper and lower piston ring groove surfaces, a member embedded in said piston head and extending continuously around said piston head and at one of said piston ring groove surfaces and having radially extending inward portions with radially locking means for holding said member in said piston head, said member having a radial width less than the depth of said piston ring groove and having an axial width to provide sufficient rigidity and strength to prevent rupture of said member and sufficiently yieldable to respond to the expansion and contraction of said piston head and being greater than the axial width of said radial portions directly adjacent to said member, and said radial portions having a thickness radially inside of said groove greater than one-half of the groove width.

References Cited in the file of this patent

UNITED STATES PATENTS

| | | |
|---|---|---|
| 1,781,207 | Wysong | Nov. 11, 1930 |
| 2,707,136 | Fahlman | Apr. 26, 1955 |
| 2,771,328 | Wainwright et al. | Nov. 20, 1956 |
| 2,809,079 | Daub | Oct. 8, 1957 |
| 2,851,318 | Smith | Sept. 9, 1958 |

OTHER REFERENCES

Automotive Industries, vol. 105, issue No. 9, published Nov. 1, 1951; inside of back cover.

Disclaimer 3,023,061.—*Rudolph Daub*, Caldwell, N.J. PISTON HEAD STRUCTURE. Patent dated Feb. 27, 1962. Disclaimer filed May 23, 1969, by the inventor.

Hereby enters this disclaimer to claims 13 and 23 of said patent.

[*Official Gazette July 8, 1969.*]